(12) United States Patent
Katz

(10) Patent No.: US 7,796,052 B2
(45) Date of Patent: Sep. 14, 2010

(54) ONE BUTTON MULTIFUNCTION KEY FOB FOR CONTROLLING A SECURITY SYSTEM

(75) Inventor: Fred Katz, Hauppauge, NY (US)

(73) Assignee: Honeywell International Inc., Morristown, NJ (US)

( * ) Notice: Subject to any disclaimer, the term of this patent is extended or adjusted under 35 U.S.C. 154(b) by 962 days.

(21) Appl. No.: 11/392,409

(22) Filed: Mar. 29, 2006

(65) Prior Publication Data

US 2007/0229301 A1 Oct. 4, 2007

(51) Int. Cl.
*G08C 19/00* (2006.01)
(52) U.S. Cl. .............. 340/825.72; 340/5.1; 340/426.13; 702/150
(58) Field of Classification Search ............ 340/825.72, 340/825.69, 5.1; 345/158, 156, 157, 163; 702/150
See application file for complete search history.

(56) References Cited

U.S. PATENT DOCUMENTS

| | | | |
|---|---|---|---|
| 6,847,351 B2 * | 1/2005 | Noguera ................. | 345/158 |
| 7,239,301 B2 * | 7/2007 | Liberty et al. ............ | 345/158 |
| 7,248,150 B2 * | 7/2007 | Mackjust et al. ....... | 340/426.13 |
| 2005/0134454 A1 | 6/2005 | Eskildsen | |
| 2007/0067303 A1 | 3/2007 | Linjama et al. | |

FOREIGN PATENT DOCUMENTS

| WO | WO2005039144 A1 | 4/2005 |
|---|---|---|
| WO | 2005103863 A2 | 11/2005 |

\* cited by examiner

*Primary Examiner*—Vernal U Brown
(74) *Attorney, Agent, or Firm*—Barkume & Associates, P.C.

(57) ABSTRACT

A security device which is a hand held portable remote device such as a key fob that allows a user to interact with a security system using a single button. The security system functions such as arming, disarming, panic, garage door open, lamp on/off, and lamp dimming control will be displayed by the security device as control options and will be selected by a user using a forward, backward, left or right tilting motion and depressing the power on/select button. Once a control option has been selected, the security device will transmit the control option to the security system. The security device has a portable housing, a wireless communication port for interface with a security system, a display panel, an accelerometer device, and processing circuitry. The accelerometer device is used to determine the tilt of the security device and provide a control signal related to the tilt. The security device also has an infrared communication port for downloading control options, and single push button, for turning the security device on and for initiating the transmission of the output signal.

16 Claims, 3 Drawing Sheets

ONE BUTTON MULTIFUNCTION KEY FOB FOR CONTROLLING A SECURITY SYSTEM

TECHNICAL FIELD

This invention relates to security systems, and in particular to a control device that uses an accelerometer and a single button to control a security system.

BACKGROUND ART

Nearly all security systems of today utilize sophisticated control devices to perform the functions of programming the security system, arming or disarming the security system, providing a panic alert, controlling lighting, and controlling garage doors, etc. Many security systems employ multiple control devices to allow a user more flexibility in controlling the security system. The control devices may be wired or wireless wall-mounted control panels located at different entrances to the protected area or wireless portable handheld devices that can control the security system from outside the protected area.

A convenient embodiment of a wireless handheld device is a key fob that is small enough to be placed on a key chain. Key fobs are customarily used for locking and unlocking automobiles. They have room for only a few buttons to allow convenient placement of the device on a key chain which can be held in a pants pocket. The small number of buttons is a problem for security system control devices because it limits the amount of controllable functions the device can perform. It is therefore desirable for a homeowner to have a control device that performs the multiple functions of a wall mounted control panel while having the size and convenience of a key fob.

The convenient size of a key fob causes the necessity of smaller user interface components. These components may consist of buttons for selecting options, a screen for reading information, labeling of buttons, LED's for providing information to the user, and connectors for interfacing the key fob to other electronics. There is a direct relationship between the number of component and the size of the components. Larger components are easier for the user to see, but a smaller key fob with greater functionality is more desirable by the user. In addition, use of more buttons for greater functionality requires more labels for distinguishing the buttons and these labels sometimes are worn off the key fob after time causing the user to possibly push the wrong select button at times. Even if the labels are not worn off the user my accidentally select the wrong button. It is therefore desirable to limit the number of buttons on the key fob to as few as necessary while increasing the functionality of the key fob.

It is therefore an object of the present invention to provide a small portable handheld control device that can control the many functions of a security system.

It is a further object of the present invention to provide a control device with a display of the security system function which is to be selected.

It is a further object of the present invention to provide a control device with a single button for power on and for selecting security system functions.

It is a further object of the present invention to provide a control device with feedback to the user of the security device's transmissions to the security system.

Finally it is a further object of the present invention to provide a control device that is easily programmed by an installer to control a security system.

DISCLOSURE OF THE INVENTION

The present invention is a security device that is able to remotely control functions of a security system. The security device is generally a hand held portable remote device such as a key fob that allows a user to interact with the security system using a single button. The security system functions such as arming, disarming, panic, garage door open, lamp on/off, and lamp dimming control will be displayed by the security device as control options and will be selected by a user using a forward, backward, left or right tilting motion and depressing the power on/select button. Once a control option has been selected, the security device will transmit the control option to the security system. The security system procedures for performing the security system functions are well known to one skilled in the art and will not be described.

The security device comprises a portable housing, a wireless communication port for interfacing with a security system, a display panel, a motion or tilt sensing device such as an accelerometer device, and processing circuitry. The display panel is an LCD display panel and is used for displaying the control options to the user. The accelerometer device is used to determine the tilt of the security device and provide a control signal related to the tilt. The processing circuitry accepts the control signal, selects one of the control options based on the control signal, and generates an output signal based on the selected control option. The output signal is transmitted by the wireless communication port to the security system.

The security device also has a communications port such as an infrared port for receiving, during installation, the control options to be programmed into the security device. The security device further has a single user input, such as a push button, for turning the security device on and for initiating the transmission of the output signal, and an LED indicator for indicating that the transmission of the output signal has taken place.

The method of the present invention includes the steps of displaying control options to a user, tilting the security device (as explained below) to select one of the control options, measuring the tilting with an accelerometer to determine the selected control option, generating an output signal based on the selected control option, and transmitting the output signal to the security system using a wireless communication port. The method further includes the steps of turning on the security device to view the control options on the display panel, depressing a button or other user input to transmit the output signal to the security system, and illuminating an LED when the output signal is transmitted.

Since the accelerometer device in the preferred embodiment can measure the tilt in four different directions, the tilt in each direction can signify a different input. The security device is held in the user's palm as it is turned on by depressing a button. After the security device is powered on from its hibernation mode, the display reveals three control options. The control option in the center is the selected control option. The user may tilt the security device forward to scroll the control options up or tilt the security device backward to scroll the control options down. A left tilt enables the selected control option, such as arming the security system, and a right tilt disables the selected control option, such as disarming the security system. Once the user has selected the control option, the user depresses the button again to transmit the control option.

BEST MODE FOR CARRYING OUT THE INVENTION

Figure 1:
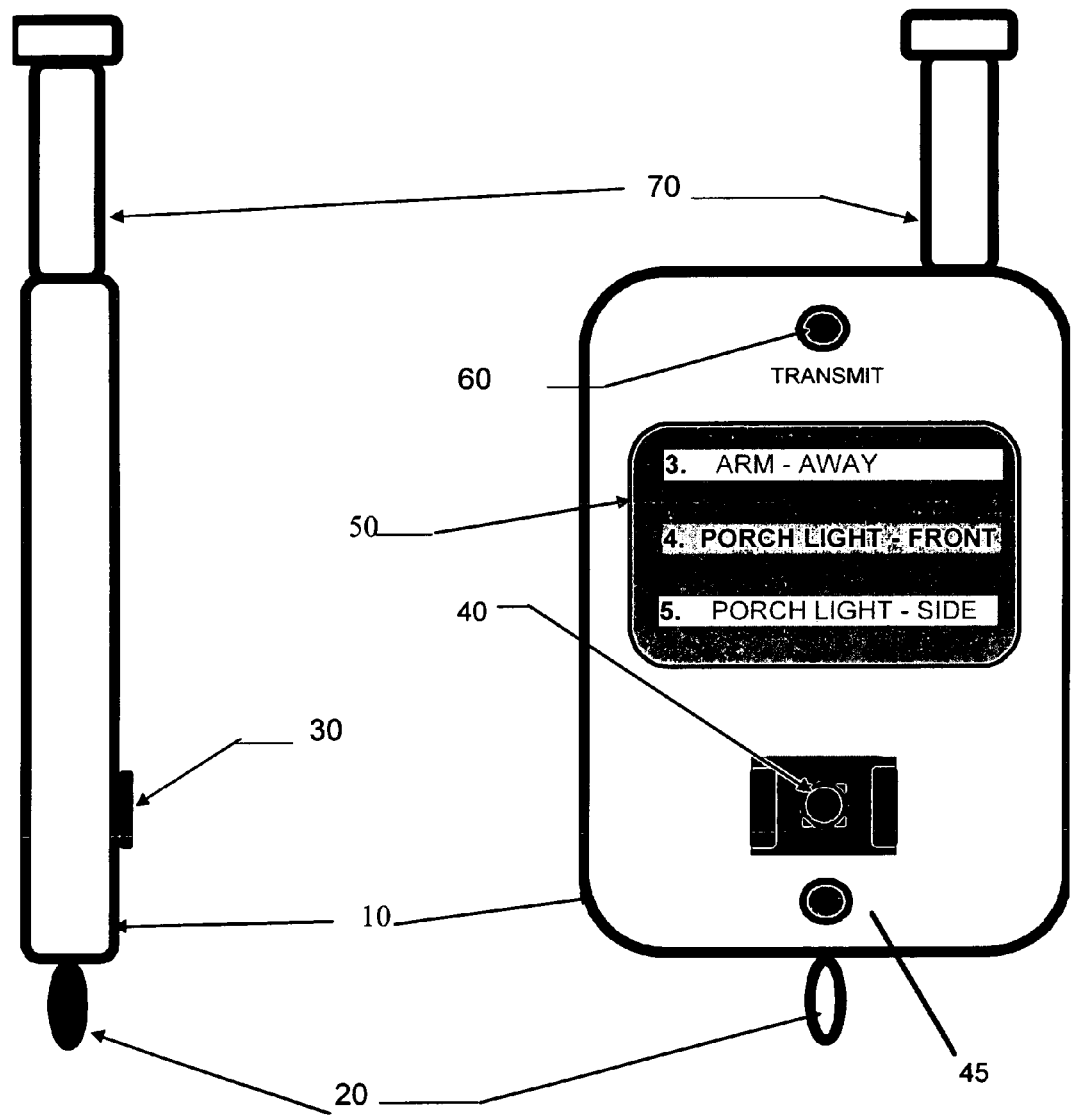
FIG. 1 is a diagram of the security device of the present invention.

The preferred embodiments of the present invention will now be described with respect to the Figures. FIG. 1 illustrates the security device 5 as a key fob. Shown are front and side views of the key fob housing 10. The key fob housing 10 has an antenna 70 and a keychain loop 20 attached to it. The antenna 70 provides a large transmission range, while the keychain loop 20 allows the security device 5 to be easily attached to a keychain. The antenna 70 may be extendable, fully retractable, or built-in (totally internal). The key fob housing 10 contains a recessed power on/select button 40 with guard 30, an LCD display 50, and an LED 60. The power button is pushed to turn the security device 5 on. If it is turned on accidentally, it will turn itself off after a short time of inactivity. Once the security device 5 is turned on, the LCD display 50 will be lit by the backlight LED 110 (shown in FIG. 2) and three control options will be displayed. For example, the LCD display 50 presently shows the control options "3. ARM-AWAY", "4. PORCH LIGHT_FRONT", and "5. PORCH LIGHT_SIDE". A predefined number of control options will be available in a list form, and the user will either select the control option currently in the center of the display (i.e. the option having the focus) or scroll through the list until a desired control option is in the center of the display and has the focus. Once the user reads the control options, he uses the power on/select button 40 to select the center control option or tilts the security device 5 forward or backward to scroll to a different control option. The LED 60 provides feedback to the user that the control option has been transmitted by the security device 5.

Figure 2:
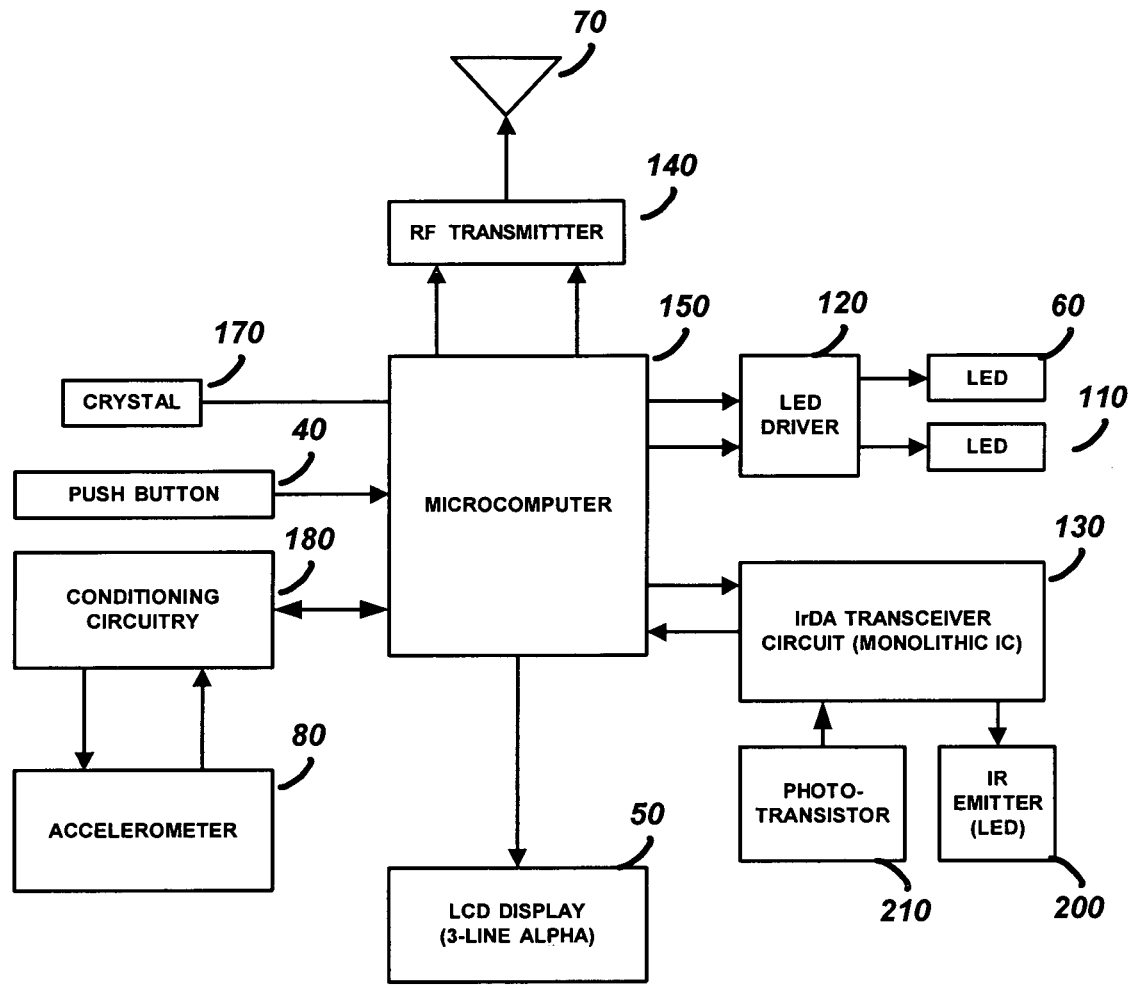
FIG. 2 is a circuit diagram of the present invention.

FIG. 2 shows a circuit diagram of the security device 5. The security device's processor is a single chip microcomputer 150 with a clock input from crystal 170. The microcomputer 150 is normally in a sleep mode or hibernation state, drawing very little battery power. When the power on/select button 40 is pushed, the microcomputer 150 wakes up and places the control options on the LCD display 50. The microcomputer 150 contains a built in LCD driver that directly controls the LCD display 50. The microcomputer 150 also sends a signal to the LED driver 120 that causes the backlight LED 110 to be lit behind the LCD display 50, which allows the user to see the control options.

The microcomputer 150 receives input data from the power on/select button 40 and the accelerometer 80 to determine the control option to be transmitted by the RF transmitter 140. Once the power on/select button 40 powers on the microcomputer 150, it functions as a selection input that causes the middle control option (the option with the focus) displayed on the LCD display 50 to be transmitted. The input data from the accelerometer 80 informs the microcomputer 150 as to when and how to change the control options displayed by the LCD display 50. When the user tilts the security device forward, backward, left, or right, the accelerometer 80 provides a measure of the acceleration in the X direction and the Y direction. The conditioning circuitry 180 determines the direction of the tilt from the accelerometer 80 output and the microcomputer 150 uses this information to scroll the displayed control options up or down, or cause the center control option to be turned on or off, respectively. The accelerometer 80 is a Motorola MMA6200 integrated circuit. It consists of a capacitive sensing cell (g-cell) and a signal conditioning ASIC. The g-cell is a mechanical structure formed from three semiconductor plates with two capacitors between the three plates. As the center plate moves with acceleration, the distance between the plates changes and each capacitor's value will change. The ASIC uses switched capacitor techniques to measure the g-cell capacitors and extract the acceleration data from the difference between the two capacitors. The acceleration sensing determines the tilt of the key fob by sensing the direction and magnitude of the acceleration of gravity in order to define in space the positional aspect (tilt) of the keyfob.

Once the user has tilted the security device 5 to display the desired control option, and/or has selected the on/off mode of the control option, and has depressed the power on/select button 40, the microcomputer transmits the appropriate message data to the RF transmitter 140. The RF transmitter 140 accepts the message data from the microcomputer 150 and when commanded by the microcomputer 150 converts the data to an RF message and transmits it to the security system through antenna 70. The microcomputer 150 sends a signal to the LED driver 120 that causes the LED 60 to be illuminated indicating to the user that a command has been transmitted. The message structure and the transmit protocols are compatible with home security control panels as known in the art. The signals transmitted may also be compatible with receiver devices that interface with X-10 type Line Voltage control modules, equivalent AC power control devices, or wireless control units, all also well known in the art.

The control options displayed on the LCD display 50 are programmed into the microcomputer through the IRDA transceiver circuit 130 at installation. A communications link is established using the phototransistor 210 and the IR emitter 200. The aperture of the IrDA port is a dark red optical window 45 fabricated out of an infrared-transmissive plastic lens that shields external non-infrared light from coming in, but permits infrared light from coming in and going out. This is located for example purposes, below the single button as shown on FIG. 1.

The installer uses a laptop computer or the like to program the control option list and transmits the control option list to the security device 5 using the established phototransistor 210 link.

Figure 3:
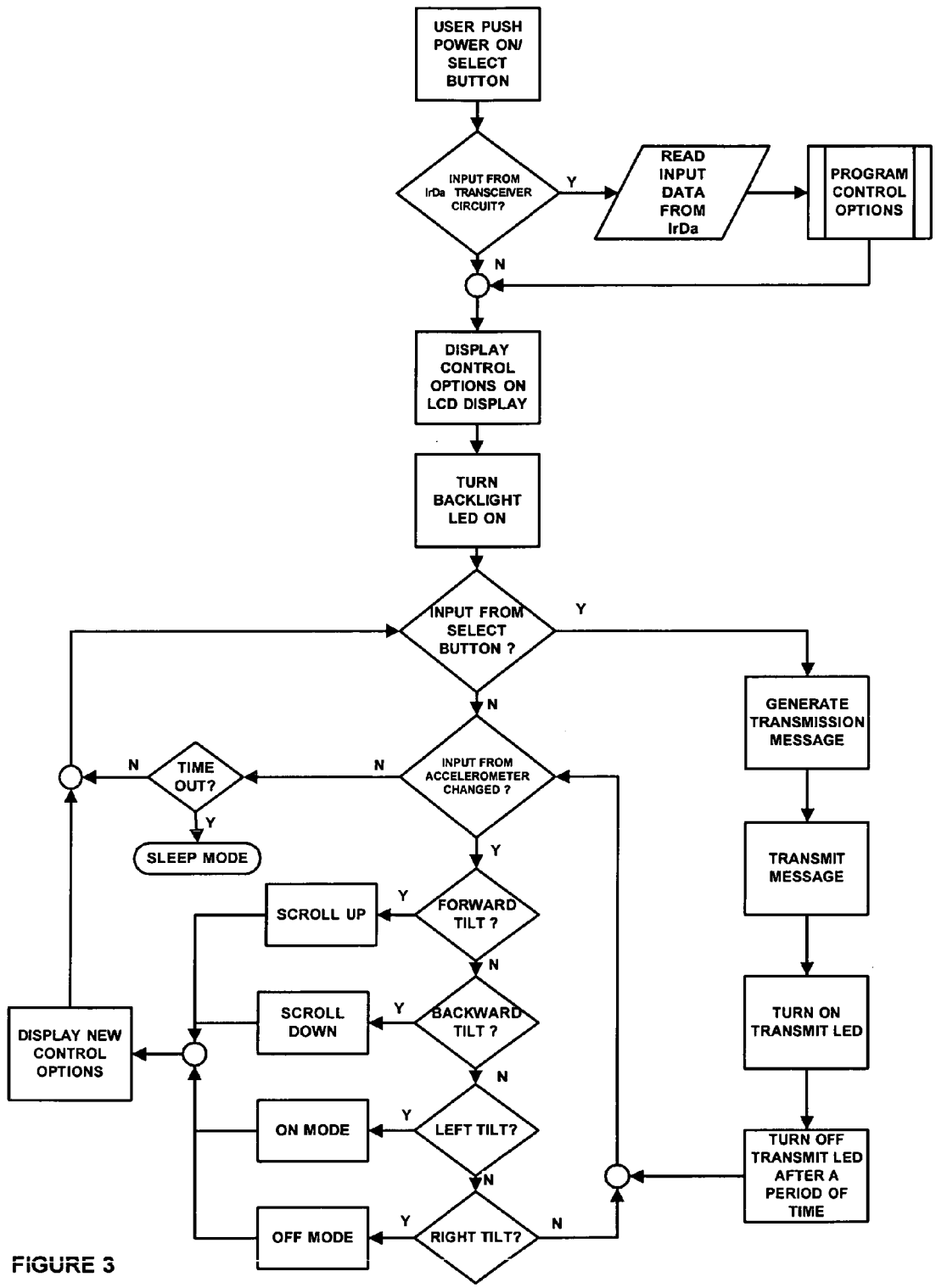
FIG. 3 is a mode of operation flowchart of the present invention.

FIG. 3 shows a top level flow diagram of the microcomputer 150 operation. When the power on/select button 40 is pushed the microcomputer 150 checks for an input from the IrDa transceiver and if there is an input a connection is made to the transmitting computer and data is read over the connection. The data will be programmed as the control options stored in the microcomputer's 150 memory. The data transmission over an IrDa port and the programming of the microcomputer 150 memory are well known processes to one skilled in the art. After the control options are stored or if there is no input from the IrDa, the control options are displayed on the LCD 50 and the backlight LED 110 is lit. The microcomputer 150 checks for an input from the power on/select button 40. If there is none, the microcomputer 150 checks for an input from the accelerometer conditioning circuitry 180. If there is no change in tilt, the microcomputer checks the time to determine if enough time has passed to go into a sleep mode. If enough time has not passed, the microcomputer 150 continues to check for an input from the select button 40 and from the accelerometer conditioning circuitry 180 until the time has expired. When an input from the select button has been received, the microcomputer 150 generates a transmission message containing the control option that is in the center of the LCD display 50. The message is transmitted to RF transmitter 140 and the transmit LED 60 is turned on and after a few seconds turned off. Once a message has been transmitted, the microcomputer 150 continues to look for inputs from the accelerometer conditioning circuitry 180 and for an input from the power on/select button 140 until time has run out, which may be typically on the order of 20 seconds, and it goes into a sleep mode. When the microcomputer 150 receives an input from the accelerometer conditioning circuitry 180 it determines if the tilt was a forward, backward, left or right tilt. If it is a forward tilt, the displayed control options are changed so that the center control option is the top control option displayed, the bottom control option is the center control option, and a new control option is displayed in the bottom spot. If it is a backward tilt, the displayed control options are changed so that a new control option is display in the top spot, the top control option is displayed in the center spot, and the center control option is displayed in the bottom spot. If it is a left tilt, the control option in the center spot is turned on, and if it is a right tilt, the control option in the center spot is turned off. Next the LCD display 50 is updated with the new information, and the microcomputer continues to wait for an input from the select button 40 or from the accelerometer conditioning circuitry 180 until time has run out.

It will be apparent to those skilled in the art that modifications to the specific embodiment described herein may be made while still being within the spirit and scope of the present invention. For example, the programming of the microcomputer 150 may be different, the LCD display 50 may display more or less control options. The power on/select button 40 may not perform both functions of power on and select (i.e. they may be performed by different buttons).

What is claimed is:

1. A security system comprising:
   A. a security device comprising:
      a. a housing comprising an input button,
      b. a wireless communication port,
      c. a display panel for displaying a plurality of control options to a user, wherein one of said plurality of control options is selected,
      d. an accelerometer device for determining a tilt of the security device comprising a forward tilt and a backward tilt, and for providing a control signal related to the tilt, and
      e. processing circuitry for:
         i. accepting said control signal,
         ii. if the control signal is related to a forward tilt, then scrolling the display of control options in an up direction to select a first different control option from said plurality of control options; and if the control signal is related to a backward tilt, then scrolling the display of control options in a down direction to select a second different control option from said plurality of control options; and
         iii. transmitting, on detecting an activation of the input button, an output signal based on the selected control option, said output signal transmitted by said wireless communication port, and
   B. a security system control panel adapted to receive said output signal transmitted by said wireless communication port of said security device and to perform a security system function based on said output signal transmitted by said wireless communication port.

2. The security system of claim 1 wherein the housing is portable.

3. The security system of claim 1 wherein said selected control option causes said security system control panel to perform an arming of said security system.

4. The security system of claim 1 wherein said selected control option causes said security system control panel to perform an disarming of said security system.

5. The security system of claim 1 wherein said selected control option causes said security system control panel to perform a panic function.

6. The security system of claim 1 wherein said control options cause said security system control panel to perform a door open function.

7. The security system of claim 1 wherein said selected control option causes said security system control panel to perform a garage door open function.

8. The security system of claim 1 wherein said selected control option causes said security system control panel to perform a lamp on/off function.

9. The security system of claim 1 wherein said selected control option causes security system control panel to perform a lamp dimming function.

10. A method of controlling a security system comprising the steps of:
    a. displaying to a user on a display of a portable security device comprising an input button and a wireless communication port a plurality of security system control options, wherein one of said plurality of control options is selected,
    b. tilting said portable security device forward to scroll the display in an up direction to select a first different security system control option from said plurality of control options, or tilting said portable security device backward to scroll the display in a down direction to select a second different security system control option from said plurality of control options,
    c. determining said selected security system control option,
    d. generating an output signal based on said selected security system control option,
    e. transmitting, on detecting an activation of the input button, by said wireless communication port said output signal,
    f. receiving by a security system control panel said output signal transmitted by said wireless communication port, and
    g. performing by said security system control panel a security system function based on said output signal transmitted by said wireless communication port.

11. The method of claim 10 further comprising the step of actuating a user input on said portable security device to initiate the transmission of said output signal.

12. The method of claim 10 wherein said tilt of said portable security device causes said display to display different security system control options.

13. The method of claim 10 wherein said selected control option causes said security system control panel to perform an arming of said security system.

14. The method of claim 10 wherein said selected control option causes said security system control panel to perform an disarming of said security system.

15. The method of claim 10 wherein said selected control option causes said security system control panel to perform a panic function.

16. The method of claim 10 wherein said selected control option causes said security system control panel to perform a door open function.

* * * * *